(12) United States Patent
Takaoka et al.

(10) Patent No.: US 9,326,258 B2
(45) Date of Patent: Apr. 26, 2016

(54) WIRELESS COMMUNICATION TERMINAL AND POWER CONTROL METHOD

(75) Inventors: Shinsuke Takaoka, Osaka (JP); Daichi Imamura, Kanagawa (JP); Masayuki Hoshino, Kanagawa (JP); Takashi Iwai, Ishikawa (JP); Akihiko Nishio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 281 days.

(21) Appl. No.: 13/995,262

(22) PCT Filed: Dec. 22, 2011

(86) PCT No.: PCT/JP2011/007218
§ 371 (c)(1),
(2), (4) Date: Jun. 18, 2013

(87) PCT Pub. No.: WO2012/093455
PCT Pub. Date: Jul. 12, 2012

(65) Prior Publication Data
US 2013/0272257 A1 Oct. 17, 2013

(30) Foreign Application Priority Data

Jan. 7, 2011 (JP) .................................. 2011-002285

(51) Int. Cl.
*H04W 52/42* (2009.01)
*H04B 7/04* (2006.01)
(Continued)

(52) U.S. Cl.
CPC ............. *H04W 52/42* (2013.01); *H04B 7/0447* (2013.01); *H04W 52/346* (2013.01); *H04W 52/146* (2013.01); *H04W 52/34* (2013.01); *H04W 52/367* (2013.01)

(58) Field of Classification Search
CPC ...... H04B 7/02; H04B 7/0452; H04B 7/0456; H04L 5/0007; H04L 5/0053; H04L 5/0091; H04L 5/001; H04L 5/0048; H04W 40/08; H04W 52/00; H04W 72/02; H04W 72/04; H04W 72/042; H04W 72/0413; H04W 72/0446; H04W 72/0473; H04W 52/04–52/248

See application file for complete search history.

(56) References Cited

U.S. PATENT DOCUMENTS 8,811,249 B2 8/2014 Seo et al.
2010/0197339 A1* 8/2010 Pedersen et al. .............. 455/522
(Continued)

FOREIGN PATENT DOCUMENTS

JP 2012-516608 A 7/2012
WO WO 2010082756 A2 * 7/2010
(Continued)

OTHER PUBLICATIONS

International Search Report for PCT/JP2011/007218 dated Mar. 13, 2012.
(Continued)

*Primary Examiner* — Alpus H Hsu
*Assistant Examiner* — Dharmesh Patel
(74) *Attorney, Agent, or Firm* — Pearne & Gordon LLP (57) ABSTRACT

Provided is a wireless communication terminal which, when SRSs are simultaneously transmitted between CCs and between antenna ports, avoids increasing the effect of bit rounding errors of D/A converters when the number of antenna ports set for SRS transmission differs between CCs. This device comprises a transmission power calculation unit (107) which calculates the transmission power of a plurality of UL channels of a plurality of CCs and a plurality of antenna ports. A power scaling detection unit (108) detects whether or not the total transmission power of the UL channels exceeds the maximum transmission power specific to a UE. When power scaling is generated, a power scaling control unit (109) uses antenna port setting information set for SRS transmission between CCs to perform power scaling in such a way that all scaling weights are uniform between CCs, or between CCs and between antenna ports.

5 Claims, 8 Drawing Sheets

(51) Int. Cl.
*H04W 52/34* (2009.01)
*H04W 52/14* (2009.01)
*H04W 52/36* (2009.01)

(56) References Cited

U.S. PATENT DOCUMENTS

| | | | |
|---|---|---|---|
| 2010/0246561 A1* | 9/2010 | Shin et al. | 370/345 |
| 2010/0273520 A1 | 10/2010 | Pelletier et al. | |
| 2011/0081934 A1* | 4/2011 | Imamura et al. | 455/522 |
| 2011/0199945 A1* | 8/2011 | Chang et al. | 370/281 |
| 2011/0280169 A1 | 11/2011 | Seo et al. | |
| 2014/0211721 A1 | 7/2014 | Pelletier et al. | |

FOREIGN PATENT DOCUMENTS

| | | |
|---|---|---|
| WO | 2010/087623 A2 | 8/2010 |
| WO | 2010/107880 A2 | 9/2010 |
| WO | WO 2010098593 A2 * | 9/2010 |

OTHER PUBLICATIONS

Panasonic, SRS power control in Rel.10, 3GPP TSG-RAN WG1 Meeting #63, R1-106070, Nov. 2010, pp. 1-5.
Research in Motion, UK Ltd., Remaining issue on power scaling for CA, 3GPP TSG-RAN WG1 Meeting #63, R1-106125, Nov. 2010, pp. 1-2.
Texas Instruments, On Rel-10 SRS Power Control, 3GPP TSG-RAN WG1 Meeting #63, R1-105890, Nov. 2010, pp. 1-2.
R1-106195, Remaining issues on uplink power control, 3GPP TSG RAN WG1 #63 meeting, Jacksonville, USA, Nov. 15-19, 2010.
R1-106131, SRS power control issue, 3GPP TSG RAN WG1 #63 meeting, Jacksonville, USA, Nov. 15-19, 2010.
3GPP TS 36.213 V8.8.0 (Sep. 2009) Physical layer procedures.
"DC-HSUPA power scaling", 3GPP TSG RAN WG1 Meeting #57, R1-091894, May 4-8, 2009, San Francisco, United States.
Supplemental European Search Report for Application No. 11855107.6 dated Nov. 23, 2015.

* cited by examiner

WIRELESS COMMUNICATION TERMINAL AND POWER CONTROL METHOD

TECHNICAL FIELD

The present invention relates to a radio communication terminal apparatus and a power control method.

BACKGROUND ART

In 3rd Generation Partnership Project (3GPP), studies have been carried out on LTE-Advanced (hereinafter, abbreviated as "LTE-A"). In LTE-A, the introduction of a bandwidth expansion technology called "carrier aggregation" (CA) has been discussed. In LTE-A CA, a plurality of component carriers (CC), each having a 20 MHz bandwidth, for example, are bundled. Thus, an approach aiming at high-speed transmission through aggregation of a plurality of carriers is taken in downlink (DL) and uplink (UL) channels in LTE-A CA. In LTE-A, the possibility of bandwidth expansion through the introduction of five CCs, i.e., up to a 100 MHz bandwidth has been discussed.

In this respect, studies have been carried out at the same time on a transmission power control method targeting UL CA. In the studies on UL transmission power control in LTE-A, the following matters (A) to (C) have been agreed. First, CC-specific transmission power control is performed (A). CC-specific (for each UL channel) maximum transmission power Pcmax, c, and user equipment (UE) specific (UE-specific) maximum transmission power Pcmax (upper limit value of total maximum transmission power for a plurality of CCs) are provided (B). In addition, when the transmission power of each UL channel transmitted on one CC exceeds the CC-specific (for each UL channel) maximum transmission power, control called power scaling, which reduces the transmission power of a UL channel, is performed (B). In addition, the power scaling is also performed when a total value of transmission power of UL channels transmitted on a plurality (all) of CCs exceeds the UE-specific maximum transmission power (when power limitation occurs) in simultaneous transmission of a plurality of UL channels. In UL CA, the power allocation priority rule for a plurality of UL channels when power limitation occurs in simultaneous transmission of a plurality of UL channels and power scaling thus occurs is agreed as follows:

PUCCH>PUSCH with UCI>PUSCH without UCI($C$).

In the priority rule mentioned above, PUCCH stands for Physical Uplink Control CHannel, and PUSCH stands for Physical Uplink Shared CHannel. UCI is an abbreviation for Uplink Control Information, and for example, includes the following control information, specifically. Namely, UCI includes acknowledgment/non acknowledgment (ACK/NACK), rank indicator (RI), channel quality information (CQI), pre-coding matrix indicator (PMI) and channel state information (CSI). A periodic or aperiodic transmission method is used for transmitting the information such as CSI and CQI.

In addition, the term "PUSCH with UCI" refers to a PUSCH on which UCI is multiplexed, and the term "PUSCH without UCI" refers to a PUSCH on which no UCI is multiplexed. Accordingly, when power scaling occurs in simultaneous transmission of a plurality of UL channels, the transmission power is allocated in the following order: the transmission power for PUCCH; the transmission power for PUSCH on which UCI is multiplexed; and the transmission power for PUSCH on which no UCI is multiplexed. This rule applies regardless of whether these channels are on the same CC or on different CCs.

When a plurality of PUSCHs on which no UCI is multiplexed (PUSCH without UCI) are present, and the total value of transmission power of UL channels transmitted on a plurality (all) of CCs exceeds the UE-specific maximum transmission power, the terminal operation that applies power scaling uniformly on the plurality of PUSCHs without UCI is used. Specifically, power scaling is performed in this case by multiplying the transmission power of a plurality of PUSCHs without UCI under the CC-specific power control by the same scaling weight (w_C($\leq$1)) between the CCs.

In addition, studies have been carried out on a power allocation rule used when power scaling in CA relating to a periodic or aperiodic sounding reference symbol (SRS) used for measuring (sounding) channel quality such as CQI occurs.

Non-Patent Literatures (hereinafter, abbreviated as "NPL") 1 and 2 disclose a power scaling method used when the total transmission power of a plurality of SRSs simultaneously transmitted on a plurality of CCs exceeds the UE-specific maximum total transmission power (power limitation occurs), for example. Specifically, scaling processing with respect to the plurality of SRSs among the CCs is performed by reusing the same scaling weight (w_C) applied to the PUSCHs on which no UCI is multiplexed among the CCs, i.e., by multiplying the transmission power of the plurality of SRSs by the scaling weight (w_C). As a result, even when power limitation occurs in simultaneous transmission of SRSs on a plurality of CCs, the terminal can appropriately determine the SRS transmission power for each CC according to this rule. The SRS transmission power is set by providing an offset to the PUSCH transmission power. Thus, the method described above that applies the scaling weight (w_C) for PUSCHs without UCI to SRSs is a highly compatible approach.

Figure 1:
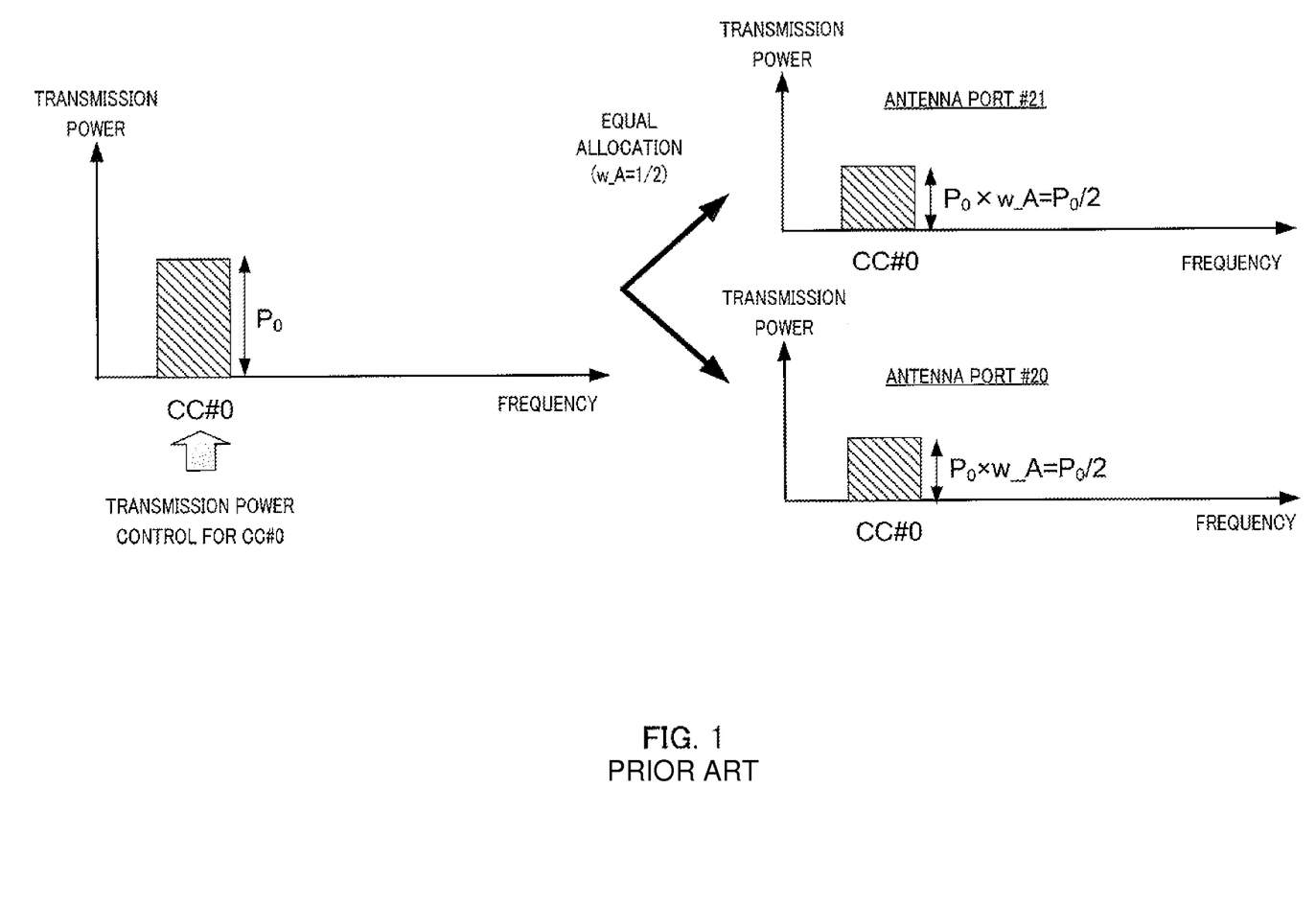
FIG. 1 is a diagram illustrating a method of allocating transmission power between antenna ports in multiple-antenna transmission.

Meanwhile, in LTE-A UL transmission, the introduction of CA and multi-input and multi-output (MIMO) transmission using multiple antennas has been decided. In the transmission power control in UL-MIMO, the transmission power controlled for each CC is allocated equally to an antenna port configured for each CC (transmission power controlled for each CC is equally scaled and then allocated to each antenna port). In this manner, the transmission power of a UL channel transmitted from each antenna port is determined. For example, as illustrated in FIG. 1, when two antenna ports are configured on a CC, the (total) transmission power ($P_0$) for the applicable CC under CC-specific transmission power control is divided by two (by multiplying the (total) transmission power for the applicable CC by scaling weight w_A=½($\leq$1) in antenna port domain). The resultant transmission power after the scaling is equally allocated to the two antennas.

Accordingly, when CA and multiple-antenna (such as MIMO or diversity) transmission are both employed, CC-specific power control in the CC (frequency) domain, and power scaling processing in antenna port (spatial) domain are performed. Accordingly, the transmission power of each of a plurality of UL channels to be simultaneously transmitted using a plurality of CCs and multiple antennas is determined. Firstly, the total transmission power (total value of transmission power) of UL channels to be transmitted via multiple antennas is controlled for each CC in the CC (frequency) domain (1). Next, the total transmission power for each CC that is determined (controlled) in (1) is equally allocated to the configured antenna ports in the antenna port (spatial) domain (2).

As described above, the method disclosed in NPLs 1 and 2, which is the power scaling method used for a plurality of SRSs in CA during power limitation, is combined with the equal power allocation (power scaling) method in the antenna port domain when multiple antennas are used. Accordingly, it is possible to make power scaling rules used when the total transmission power of all SRSs transmitted using a plurality of CCs and a plurality of antenna ports exceeds the UE-specific maximum transmission power (when power limitation occurs) in a configuration employing CA and multiple-antenna (such as MIMO or diversity) transmission together. The SRS transmission power is equally scaled between CCs (frequencies) by using the power scaling weight (w_C) used for a plurality of PUSCHs without UCI between CCs (1). The transmission power is equally allocated between antenna ports by multiplying transmission power for each CC obtained as a result of scaling between CCs, by scaling weight w_A in the antenna port domain (2).

Figure 2:
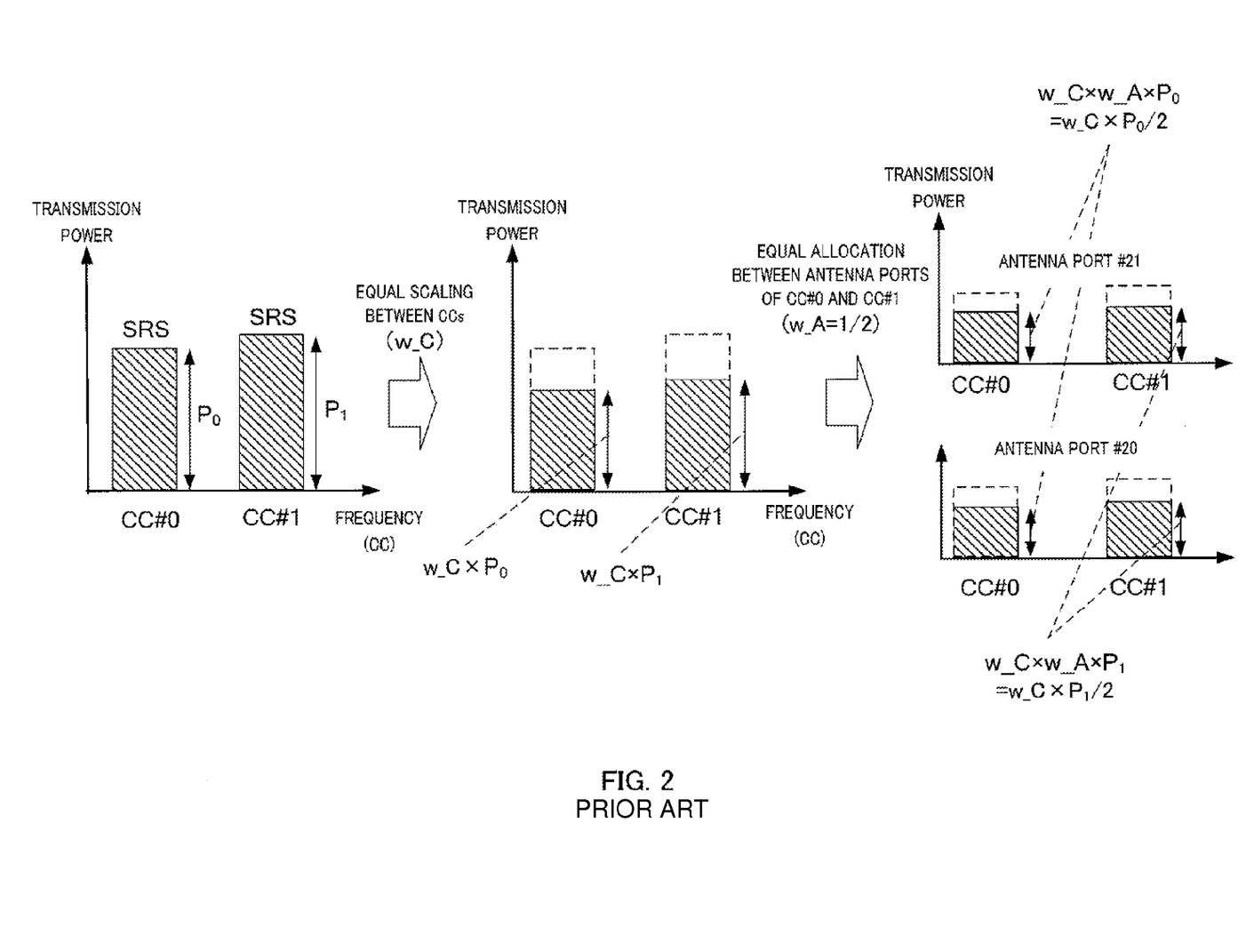
FIG. 2 is a diagram illustrating a power scaling method used when carrier aggregation and multiple-antenna transmission are both employed.

FIG. 2 illustrates a case where the number of CCs is two and each CC is configured with two antenna ports for SRS transmission. According to rule (1) mentioned above, transmission power $P_0$ and $P_1$ controlled respectively by CC#0 and CC#1 are multiplied by equal power scaling weight (w_C) between CCs for a plurality of PUSCHs without UCI. Accordingly, the transmission power of CC#0 and CC#1 is reduced to (w_C×$P_0$) and (w_C×$P_1$).

Next, according to rule (2) described above, the transmission power of antenna port #20 of CC#0, antenna port #21 of CC#0, antenna port #20 of CC#1, and antenna port #21 of CC#1 is determined to be (w_C×w_A×$P_0$), (w_C×w_A×$P_0$), (w_C×w_A×$P_1$), and (w_C×w_A×$P_1$), respectively, by using the equal scaling weight in antenna port domain (w_A=½).

CITATION LIST

Non-Patent Literatures

NPL 1
R1-106131, SRS power control issue, 3GPP TSG RAN WG1 #63 meeting, Jacksonville, USA, 15-19, Nov., 2010
NPL 2
R1-106195, Remaining issues on uplink power control, 3GPP TSG RAN WG1 #63 meeting, Jacksonville, USA, 15-19 Nov. 2010
NPL 3
3GPP TS 36.213 V8.8.0 (2009-09)

SUMMARY OF INVENTION

Technical Problem

The techniques disclosed in NPLs 1 and 2 as well as the related art using the techniques in combination, however, involve the following problems. Specifically, when the number of antenna ports configured for SRS transmission varies between CCs, the total scaling weight between the CCs and between the antenna ports varies between the CCs. More specifically, different power scaling is unfavorably applied between a CC having a larger number of antenna ports configured for SRS transmission and a CC having a smaller number of antenna ports configured for SRS transmission.

Figure 3:
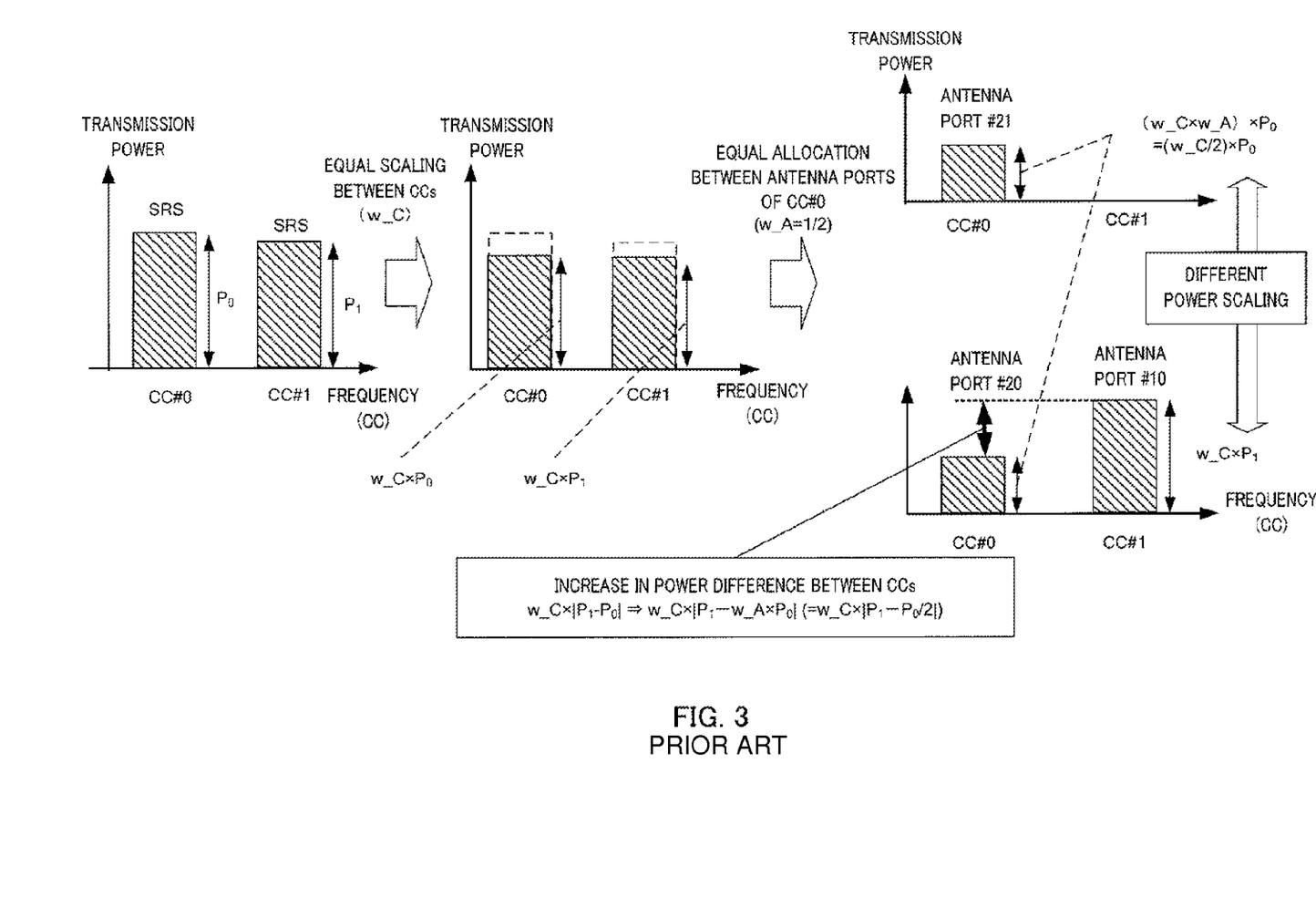
FIG. 3 is a diagram illustrating a power scaling method based on the techniques disclosed in NPLs 1 and 2 and used when carrier aggregation and multiple-antenna transmission are both employed and the number of antenna ports varies between component carriers.

FIG. 3 illustrates a case where CC#0 is configured with two antenna ports for SRS transmission while CC#1 is configured with one antenna port for SRS transmission. When the related art using the techniques in combination described in FIG. 2 is used in this case, transmission power $P_0$ controlled by CC#0 for antenna ports #20 and #21 of CC#0 is scaled by the total weight (w_C×w_A=w_C/2), and transmission power $P_1$ controlled by CC#1 for antenna port #10 of CC#1 is scaled by the weight (w_C).

Accordingly, as compared with the transmission power difference between the CCs before power scaling between antenna ports (equal power allocation between the antenna ports of CC#0) (w_C×|$P_1$−$P_0$|), the transmission power difference between the CCs after the power scaling between the CCs and between the antenna ports increases unfavorably (w_C×|$P_1$−w_A×$P_0$|=w_C×|$P_1$−$P_0$/2|) because w_A≤1. To put it differently, the following relation is true:

$$w\_C \times |P_1 - P_0| < w\_C \times |P_1 - w\_A \times P_0|.$$

Such an increase in power difference between CCs causes a problem in that undesirable effects on bit rounding errors in a digital to analog converter (D/A converter) configured to simultaneously convert a plurality of SRSs from digital signals to analog signals increases. Specifically, when the dynamic range of the D/A converter is set in a way that prevents distortion of high transmission power SRS signals, low transmission power signals cannot be correctly represented in the D/A converter (error increases).

In particular, the abovementioned problem becomes more significant in a terminal configured to use a single D/A converter to convert a plurality of signals from digital signals to analog signals, simultaneously. Examples of such a configuration includes a configuration in which one inverse fast Fourier transform (IFFT) is applied first to two SRSs transmitted using two CCs, and then, the signals outputted after the IFFT are inputted to a D/A converter.

Figure 4:
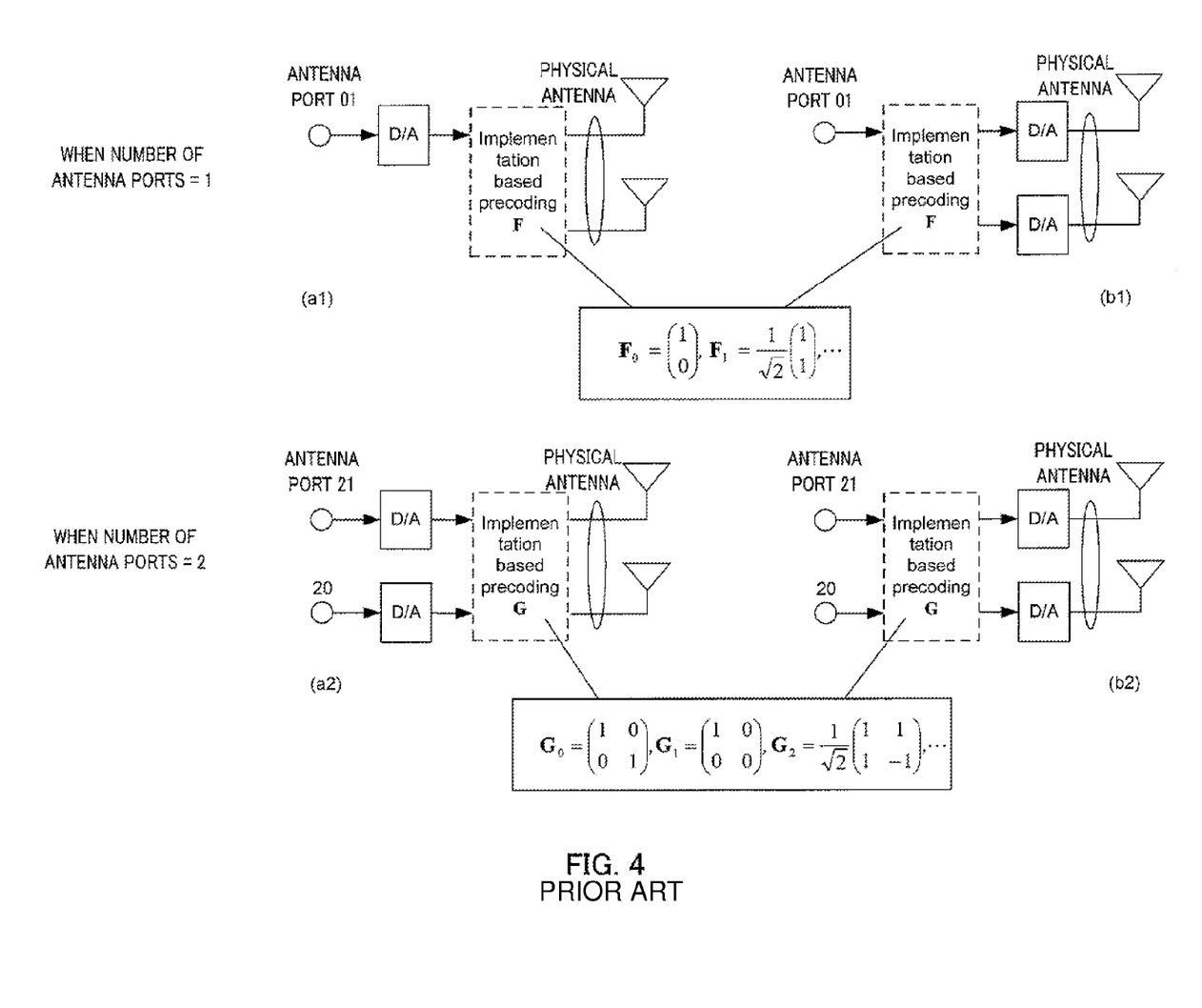
FIG. 4 is a diagram illustrating a relation between an antenna port, a physical antenna, and a D/A converter.

A description will be briefly provided herein regarding a technical concept called "antenna port (number)" defined in 3GPP, as well as the relation between an antenna port, a physical antenna and a D/A converter (their positions in a terminal) with reference to FIG. 4 for providing an additional explanation of the problem.

FIG. 4 illustrates a case where the number of antenna ports is one and a case where the number of antenna ports is two. In addition, FIG. 4 illustrates two configurations in each of the cases to indicate a difference in implementation position between two configurations (a) before implementation based precoding and (b) after implementation based precoding. In addition, the number of physical antenna ports is two in FIG. 4.

Configuration (a1) indicates a case where the number of antenna ports is one and the implementation position of the D/A converter is before implementation based precoding. Configuration (b1) indicates a case where the number of antenna ports is one and the implementation position of the D/A converters is after implementation based precoding. Configuration (a2) indicates a case where the number of antenna ports is two and the implementation position of the D/A converters is before implementation based precoding. Configuration (b2) indicates a case where the number of antenna ports is two and the implementation position of the D/A converters is after implementation based precoding.

The term "implementation based precoding" refers to a unit configured to perform precoding (such as beam forming or sector beam) processing, which is dependent on the implementation of the terminal. For example, a precoding matrix (e.g., F($F_0$, $F_1$), G($G_0$, $G_1$, $G_2$)) as illustrated in FIG. 4 can be used.

Referring to FIG. 4, a case will be discussed as an example in which CC#0 is configured with two antenna ports for SRS transmission while CC#1 is configured with one antenna port for SRS transmission. This case corresponds to the case illustrated in FIG. 3. Moreover, in this case, the implementation position of the D/A converters and implementation based precoding matrix $G_0$ (unit matrix) of the configuration (b2) are used in CC#0, while the implementation position of the D/A converters and implementation based precoding matrix $F_0$ (matrix unit) of the configuration (b1) are used in CC#1. In this case, the signal inputted to each antenna port is not combined with the signal inputted to a different antenna port from the implementation precoding, and the signals are outputted to the respective D/A converters in both CC#0 and CC#1. Accordingly, since the plurality of signals (signal of CC#0 and signal of CC#1) are inputted to the same D/A converters, the plurality of signals are simultaneously converted from digital signals to analog signals by each one of the D/A converters in this configuration. As a result, when a power difference between the plurality of signals is large, the problem described above occurs in the D/A converters in this configuration.

In addition, it can be said that the example described above with reference to FIGS. 3 and 4 corresponds to a case where an antenna port and a physical antenna are associated in one-to-one correspondence.

It should be noted that, even if the related art is used, the phenomenon that the power difference increases because of the power scaling processing does not occur in the case of a configuration employing CA or multiple antenna transmission alone. Thus, the abovementioned problem does not occur either in this configuration.

Moreover, a base station (eNB) uses SRSs transmitted from multiple antennas of a terminal and selects a precoding weight previously defined by standardization which eliminates dependency on terminal implementation (e.g., 3GPP Long Term Evolution (LTE), or a precoding weight of a discrete Fourier transform (DFT) matrix or the like in the case of MIMO transmission using two transmission antennas in LTE-Advanced). If there is a power difference between SRSs to be transmitted, there arises another problem in that, when reporting precoding weights selected by the base station to the terminal, the base station cannot select a beam pattern with correct precoding weights (e.g., cannot select correct precoding weights that maximize the throughput). Stated differently, the significance of equally scaling the SRS transmission power between antenna ports increases when carrier aggregation and multiple-antenna transmission are both employed.

It is an object of the present invention to provide a radio communication terminal and a power control method each of which makes it possible to avoid an increase in undesirable effects on bit rounding errors of low transmission power signals in a D/A converter (while preventing distortion of high transmission power signals) when CA and multiple-antenna transmission are both employed.

Solution to Problem

A radio communication terminal apparatus according to an aspect of the present invention includes: a transmission power calculating section that calculates transmission power of a plurality of uplink channels on a plurality of component carriers of carrier aggregation, and a plurality of antenna ports; a power scaling detecting section that detects whether or not power scaling occurs, by detecting, using the calculated transmission power, whether or not a total value of the transmission power of uplink channels transmitted using the plurality of component carriers and the plurality of antenna ports exceeds maximum transmission power specific to the apparatus; and a power scaling controlling section that performs power scaling when the power scaling detecting section has detected that power scaling occurs, and also when a plurality of reference signals are to be transmitted using antenna ports configured for transmission of reference signals on component carriers, the power scaling being performed in such a way that a total scaling weight considering scaling weights for multiple-antenna transmission becomes equal between the component carriers, or between the component carriers and between the antenna ports, on a basis of the number of antenna ports, or antenna port positions, or antenna port numbers configured for transmission of reference signals on the component carriers.

A power control method according to an aspect of the present invention includes: calculating transmission power of a plurality of uplink channels on a plurality of component carriers of carrier aggregation, and a plurality of antenna ports; detecting whether or not power scaling occurs, by detecting, using the calculated transmission power, whether or not a total value of the transmission power of uplink channels transmitted using the plurality of component carriers and the plurality of antenna ports exceeds maximum transmission power specific to an apparatus transmitting the UL channels; and performing power scaling when it has been detected that power scaling occurs, and also when a plurality of reference signals are to be transmitted using antenna ports configured for transmission of reference signals on component carriers, the power scaling being performed in such a way that a total scaling weight considering scaling weights for multiple-antenna transmission becomes equal between the component carriers, or between the component carriers and between the antenna ports, on a basis of the number of antenna ports, or antenna port positions, or antenna port numbers configured for transmission of reference signals on the component carriers.

Advantageous Effects of Invention

According to the present invention, an increase in power difference between component carriers can be avoided even when the number of antenna ports varies between the component carriers. Thus, it is possible to avoid an increase in undesirable effects on bit rounding errors of a D/A converter. Moreover, a base station (eNB) can select a beam pattern with correct precoding weights that maximize the throughput on the basis of SRS signals received from a plurality of antenna ports, for example, and can report the information to the terminal.

DESCRIPTION OF EMBODIMENT

The present invention has been made while taking advantage of the following points. Specifically, when a plurality of SRSs are transmitted from multiple antennas (ports), configuration information such as the number of antenna ports, or the antenna port positions, or the antenna port numbers used for SRS transmission for each CC is semi-statically reported from an eNB to a terminal by higher layer (e.g., radio resource control (RRC)) signaling, which has an extremely low transmission error rate. For that reason, the configuration information such as the number of antenna ports, or the antenna port positions, or the antenna port numbers used for SRS transmission for each CC can be previously recognized between the eNB and each UE.

Hereinafter, an embodiment of the present invention will be described in detail with reference to the accompanying drawings.

Embodiment

Figure 5:
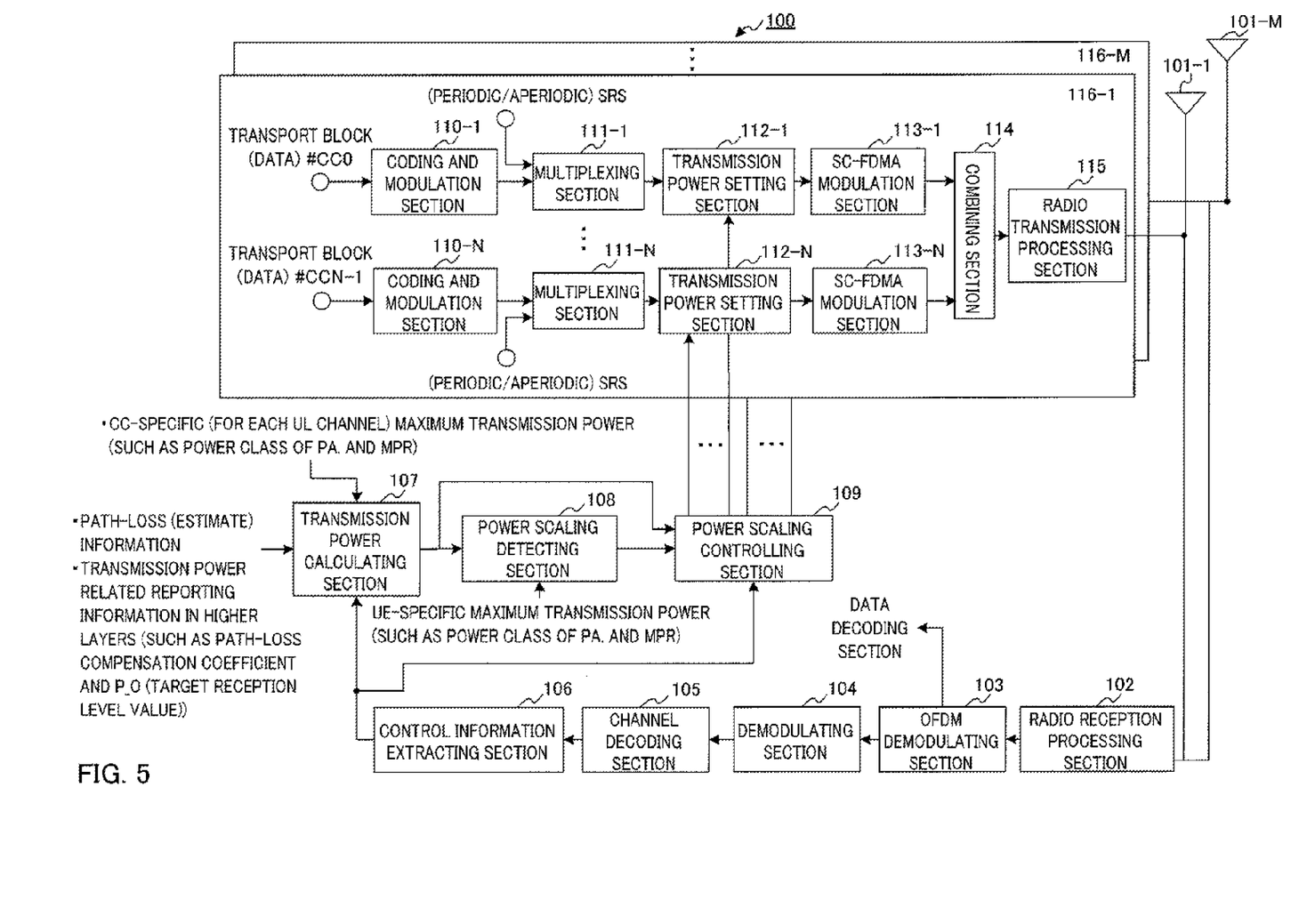
FIG. 5 is a block diagram illustrating a configuration of a radio communication terminal apparatus according to an embodiment of the present invention.

FIG. 5 is a block diagram illustrating a configuration of radio communication terminal apparatus (hereinafter, referred to as "terminal") 100 according to an embodiment of the present invention. Hereinafter, the configuration of terminal 100 will be described with reference to FIG. 5.

Radio reception processing section 102 receives an orthogonal frequency division multiplexing (OFDM) signal from a base station (eNB) via antennas 101-1 to 101-M and performs predetermined radio frequency (RF) processing such as down-conversion and A/D conversion on the received OFDM signal and outputs the processed signal to OFDM demodulating section 103.

OFDM demodulating section 103 removes a guard interval (GI) from the OFDM signal outputted from radio processing section 102 and performs a discrete Fourier transform (DFT) on the OFDM signal after the removal of guard interval to convert the OFDM signal into a frequency domain signal. Next, OFDM demodulation section 103 performs frequency-domain equalization (FDE) on frequency-domain components to remove signal distortion and outputs the processed signal to demodulation section 104.

Demodulation section 104 performs predetermined demodulation processing for a modulation scheme such as QPSK or 16QAM (quadrature amplitude modulation) on the signal outputted from OFDM demodulation section 103 and outputs the processed signal to channel decoding section 105.

Channel decoding section 105 performs decoding processing (iteration MAP decoding, Viterbi decoding) for error correction coding such as turbo coding or convolutional coding on the signal outputted from demodulation section 104 and outputs the processed signal to control information extracting section 106.

Control information extracting section 106 extracts the following information from the signal outputted from channel decoding section 105 and outputs the information to transmission power calculating section 107 and power scaling controlling section 109. The information to be extracted herein includes: UL grant information (allocation bandwidth, MCS set, PUSCH, SRS or PUCCH transmission power information (TPC command, transmission format dependent value $\Delta_{TF}$ such as MCS, and SRS offset value $P_{SRS\_offset}$), and aperiodic SRS trigger information, for example), DL grant information (PUCCH transmission power information or the like, and aperiodic SRS trigger information, for example), UCI request (trigger) information, CC/cell information such as Pcell/Sccll and PCC/SCC, and configuration control information about SRS transmission such as the number of antenna ports, or the antenna port positions, or the antenna port numbers used for SRS transmission for each CC (cell), which is included in control information or the like in higher layers.

Transmission power calculating section 107 calculates transmission power of a plurality of UL channels (on each CC) using the control information outputted from control information extracting section 106, CC-specific (each UL channel) maximum transmission power (such as power class of power amplifier (PA) and MPR), path-loss (estimate) information, transmission power related reporting information in higher layers (such us path-loss compensation coefficient and P_o (target reception level value)) (e.g., calculates the total transmission power of a plurality of SRSs transmitted from multiple antennas on each CC). As a specific calculation method, PUSCH, PUCCH and SRS transmission power calculation formulae described in NPL 3 are used, for example. Transmission power calculating section 107 outputs transmission power values of a plurality of UL channels (on each CC) to power scaling detecting section 108 and power scaling controlling section 109.

Power scaling detecting section 108 calculates the total transmission power of a plurality of CCs (all UL channels) based on the transmission power values of a plurality of UL channels outputted from transmission power calculating section 107 (e.g., total transmission power of each CC used for transmission of a plurality of SRSs from multiple antennas) and compares the calculated total transmission power with the UE-specific maximum transmission power (Pcmax) to be received as input. If the total transmission power is smaller than the UE-specific maximum transmission power, power scaling detecting section 108 outputs control information indicating "power scaling is unnecessary" to power scaling controlling section 109. On the other hand, if the total transmission power is larger than the UE-specific maximum transmission power, power scaling detecting section 108 outputs control information indicating "power scaling is necessary" to power scaling controlling section 109.

In accordance with information which indicates whether power scaling has occurred or not and which is outputted from power scaling detecting section 108, power scaling controlling section 109 uses the control information about SRS transmission such as the number of antenna ports, or the antenna port positions, or the antenna port numbers used for SRS transmission for each CC (cell), and thereby performs transmission power scaling on each UL channel (such as SRS, PUSCH and PUCCH) when the control information indicates "power scaling is necessary," and thus determines the transmission power of the plurality of UL channels to be transmitted using a plurality of antenna ports and a plurality of CCs. The transmission power information after the power scaling is outputted to transmission power setting sections 112-1 to 112-N of transmission processing block section 116-1 (likewise, the transmission power information is outputted to the transmission power setting sections of each of transmission processing block sections 116-2 to 116-M (not illustrated) in the same manner). Details of the SRS power scaling method will be described, hereinafter.

Coding and modulation sections 110-1 to 110-N perform error correction coding such as turbo coding, and predetermined modulation processing such as QPSK or 16QAM on a transport block (TB) for each CC, which is to be received as input, and output the processed signal to multiplexing sections 111-1 to 111-N.

Figure 6:
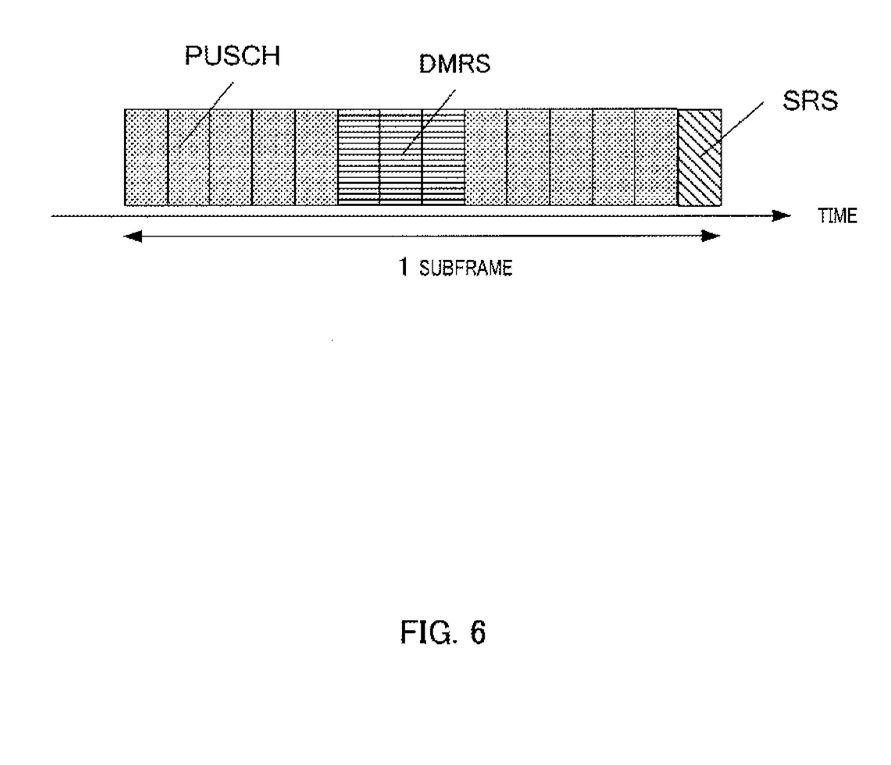
FIG. 6 is a diagram illustrating a configuration in which an SRS is multiplexed at the rear end of one subframe.

Multiplexing sections 111-1 to 111-N multiplex a periodic SRS (when triggered by higher layer control information) or aperiodic SRS (when triggered by a PDCCH, which is a physical layer control channel) to be received as input, with a modulation symbol sequence and outputs the resultant signal to transmission power setting sections 112-1 to 112-N. In LTE (LTE-A), an SRS is multiplexed only at the last symbol of one subframe consisting of 14 SC-FDMA symbols as illustrated in FIG. 6 (when SRS is time-multiplexed with PUSCH). Thus, in order to allow such time-domain multiplexing, an SRS is multiplexed at the end of the modulation symbols. FIG. 6 illustrates a case where a demodulation reference signal (DMRS) occupies roughly three symbols at a center portion of one subframe.

Transmission power setting sections 112-1 to 112-N set the transmission power for each UL channel (such as SRS, PUSCH and PUCCH) using the transmission power information on each of the plurality of UL channels (CC) outputted from power scaling controlling section 109 and output the transmission power to SC-FDMA (single carrier frequency division multiple access) modulation sections 113-1 to 113-N.

SC-FDMA modulation section 113-1 to 113-N perform DFT precoding by applying a DFT on the symbol sequences on which the transmission power has been set and which have been outputted from transmission power setting sections 112-1 to 112-N. After the signals resulting from the DFT precoding are mapped to predetermined frequency resources indicated by the eNB, the processed signals are transformed into time-domain signals by IDFT. Lastly, the processed signals after addition of a guard interval are outputted to combining section 114.

Combining section 114 combines the plurality of SC-FDMA signals outputted from SC-FDMA modulation sections 113-1 to 113-N and outputs the combined signal to radio transmission processing section 115.

Radio transmission processing section 115 performs predetermined RF processing such as D/A conversion, amplification processing, and up-conversion on the signal outputted from combining section 114 and transmits the processed signal via antenna 101-1.

Although the series of processes from coding and modulation sections 110-1 to 110-N to radio transmission processing section 115 in radio processing block section 116-1 has been illustrated above, the same series of processes is also performed in radio processing block sections 116-2 to 116-M.

Next, a description will be provided regarding power scaling methods 1 to 4 used for SRSs in simultaneous transmission of a plurality of SRSs.

(Power Scaling Method 1)

In power scaling method 1, transmission power calculating section 107 calculates transmission power of a plurality of UL channels on a plurality of CCs and a plurality of antenna ports, first.

Next, power scaling detecting section 108 detects whether or not the total value of transmission power of the UL channels transmitted using the plurality of CCs and the plurality of antenna ports exceeds the UE-specific maximum transmission power (whether or not power scaling occurs).

Next, when power scaling occurs in simultaneous transmission of a plurality of (periodic or aperiodic) SRSs using antenna ports configured for transmission of reference signals on a plurality of CCs, power scaling controlling section 109 performs power scaling. Specifically, in this case, power scaling controlling section 109 performs, on the basis of the number of antenna ports configured for SRS transmission among the CCs, power scaling in such a way that the total scaling weight considering the scaling weights for multiple-antenna transmission is equal between the component carriers, or between the component carriers and between the antenna ports.

Figure 7:
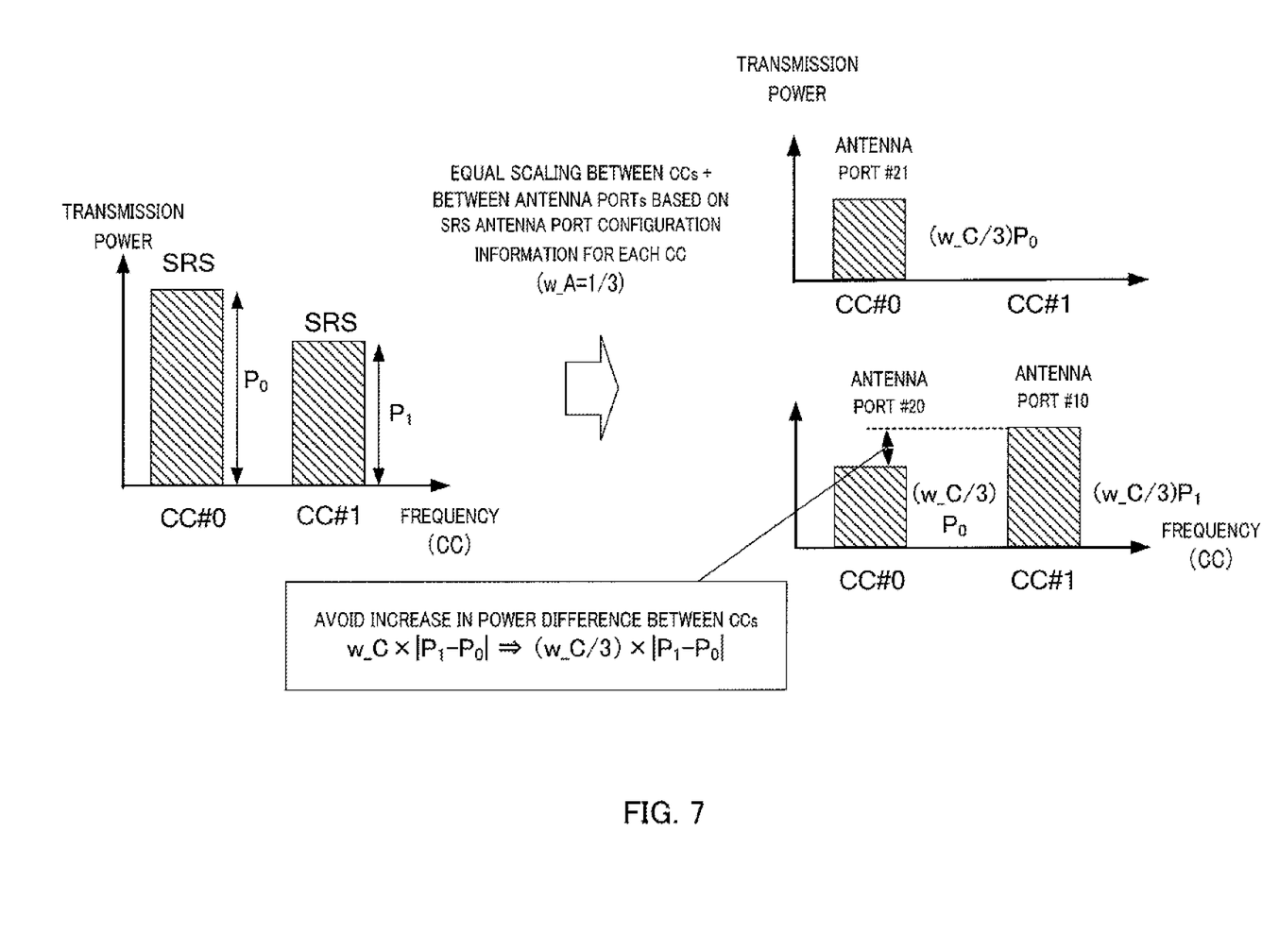
FIG. 7 is a diagram illustrating an overview of power scaling methods 1 and 2.

FIG. 7 illustrates an overview of power scaling method 1. FIG. 7 illustrates a case where CC#0 is configured with two antenna ports (antenna ports #20 and #21) for SRS transmission while CC#1 is configured with one antenna port (antenna port #10) for multiple SRS transmission by a control signal sent from the base station (higher layer signaling), when the number of CCs is two (CC#0 and CC#1). For example, only three SRSs in total are transmitted on the two CCs using the last symbol position of one subframe (see, FIG. 6). FIG. 7 illustrates operation that performs transmission power scaling for two SRSs transmitted on CC#0 and one SRS transmitted on CC#1 when the total value of transmission power of three SRS channels transmitted using two CCs exceeds the UE-specific maximum transmission power in this situation. Specifically, the transmission power scaling is performed in such a way that the total scaling weight (w_C×w_A) considering weights (w_A) for multiple-antenna transmission is equal between the component carriers and between the antenna ports by setting scaling weight w_A among the antennas (e.g., w_A=⅓) on the basis of the number of antenna ports configured for SRS transmission among the CCs.

Accordingly, even when the number of antenna ports varies between component carriers, it is possible to avoid an increase in power difference between the component carriers, thus preventing any increase in undesirable effects on bit rounding errors of a D/A converter. In addition, the base station (eNB) can select a beam pattern with correct precoding weights that maximize the throughput, for example, based on the SRS signals received from a plurality of antenna ports and can report the information to the terminal.

In addition, if the power scaling weight with respect to SRS transmission power varies between CCs as in the case of the related art, in a terminal configured to amplify SRS signals on a plurality of CCs by one power amplifier (PA), a different amplification factor needs to be set for each of the CCs (frequency bands) within one PA, which extremely complicates the configuration of the terminal. In general, when the amplification factor (power scaling weight) varies between CCs (frequency bands), the PA needs to be configured for each of the CCs (frequency bands). Stated differently, unless the terminal is provided with a plurality of PAs, the power scaling of the related art cannot be performed in the RF band. However, using the present invention described above allows simpler power scaling control to be performed in the RF band between CCs by using one PA with one amplification factor.

In addition, applying the same power scaling weight with respect to SRSs of all antenna ports of all CCs allows the same amplification factor to be configured in different PAs, i.e., enables simpler common PA control. For example, in FIG. 7, when configured to amplify SRSs from antenna ports #20 of CC#0 and #10 of CC#1 by PA #0 and to amplify an SRS from antenna port #21 of CC#0 by PA#1, the terminal may configure an amplification factor common between PA#0 and PA#1.

(Power Scaling Method 2)

Power scaling method 2 is characterized by setting the scaling weights among antenna ports to be w_A=1/(the number of SRSs on all CCs and all antenna ports configured for SRS transmission) in such a way that the total scaling weight considering the scaling weights for multiple-antenna transmission is equal between the component carriers and between the antenna ports, and by applying the scaling weight to all SRSs in power scaling method 1 described above.

FIG. 7 illustrates an overview of power scaling method 2. FIG. 7 illustrates a case where CC#0 is configured with two antenna ports (antenna ports #20 and #21) for SRS transmission and CC#1 is configured with one antenna port (antenna port #10) for multiple SRS transmission by a control signal sent from the base station (higher layer signaling), when the number of CCs is two (CC#0 and CC#1). For example, only three SRSs in total are transmitted on the two CCs using the last symbol position of one subframe (see, FIG. 6). When the total value of transmission power of three SRS channels transmitted using the two CCs exceeds the UE-specific maximum transmission power in this situation, the power scaling is performed in the following manner. The scaling weight w_A=1/(the number of SRSs on all CCs and all antenna ports configured for SRS transmission) used among the antenna ports is set equal to ⅓ in such a way that the total scaling weight (w_C×w_A) considering the weights (w_A) for multiple-antenna transmission is equal between the component carriers and between the antenna ports, on the basis of the number of antenna ports configured for SRS transmission among the CC. The weight set in the manner described above is used for scaling the transmission power of all SRSs including two SRSs transmitted on CC#0 and one SRS transmitted on CC#1.

Thus, in addition to the effects obtained with power scaling method 1 described above, it is possible to obtain the effect of minimizing the mean sum of squares of a transmission power difference between CCs for all SRSs while avoiding an increase in transmission power difference between the CCs. The processes of deriving the minimum mean sum of squares will be described below.

Avoiding an increase in transmission power difference between CCs using scaling weights km, n (where m=M−1, n=0 to Nm−1) for each SRS will be discussed. In addition, an attempt is made to "minimize the sum of mean squares of a transmission power difference between CCs for all SRSs" under the condition that "the sum of scaling weights km, n for all SRSs is kept constant (=1)." Specifically, the following expression can be used to represent this case.

(Expression 1)

$$\min_{k_{m,n}} E\left[\sum_{m=0}^{M-1}\sum_{n=0}^{N_m-1} |wk_{m,n}P_m - wk_{(m+x)\bmod M,n}P_{(m+x)\bmod M}|^2\right] \quad [1]$$

$$\text{subject to } \sum_{m=0}^{M-1}\sum_{n=0}^{N_m-1} k_{m,n} = 1$$

In expression 1, M represents the number of CCs, Nm represents the number of SRS antenna ports of m-th CC, Pm represents the total SRS transmission power of m-th CC, and x=0 to M−1.

Expression 2 can be derived by using the Lagrange multiplier method (assuming that the average transmission power between the CCs is the same) in the following manner.

(Expression 2)

$$k_{m,n} = 1 \bigg/ \sum_{m=0}^{M-1} N_m \quad [2]$$

As described above, using power scaling method 2 makes it possible to obtain the effect of avoiding an increase in transmission power difference between CCs even when the number of CCs is three or more, in addition to the same effects obtained using power scaling method 1 described above.

(Power Scaling Method 3)

Power scaling method 3 is characterized by performing power scaling in power scaling controlling section 109 by applying the equal total scaling weight considering scaling weights for multiple-antenna transmission only with respect to antenna ports (or antenna port numbers or physical antennas) simultaneously transmitting SRSs, on the basis of information on the antenna port positions (numbers) used for SRS transmission and configured for each CC.

Figure 8:
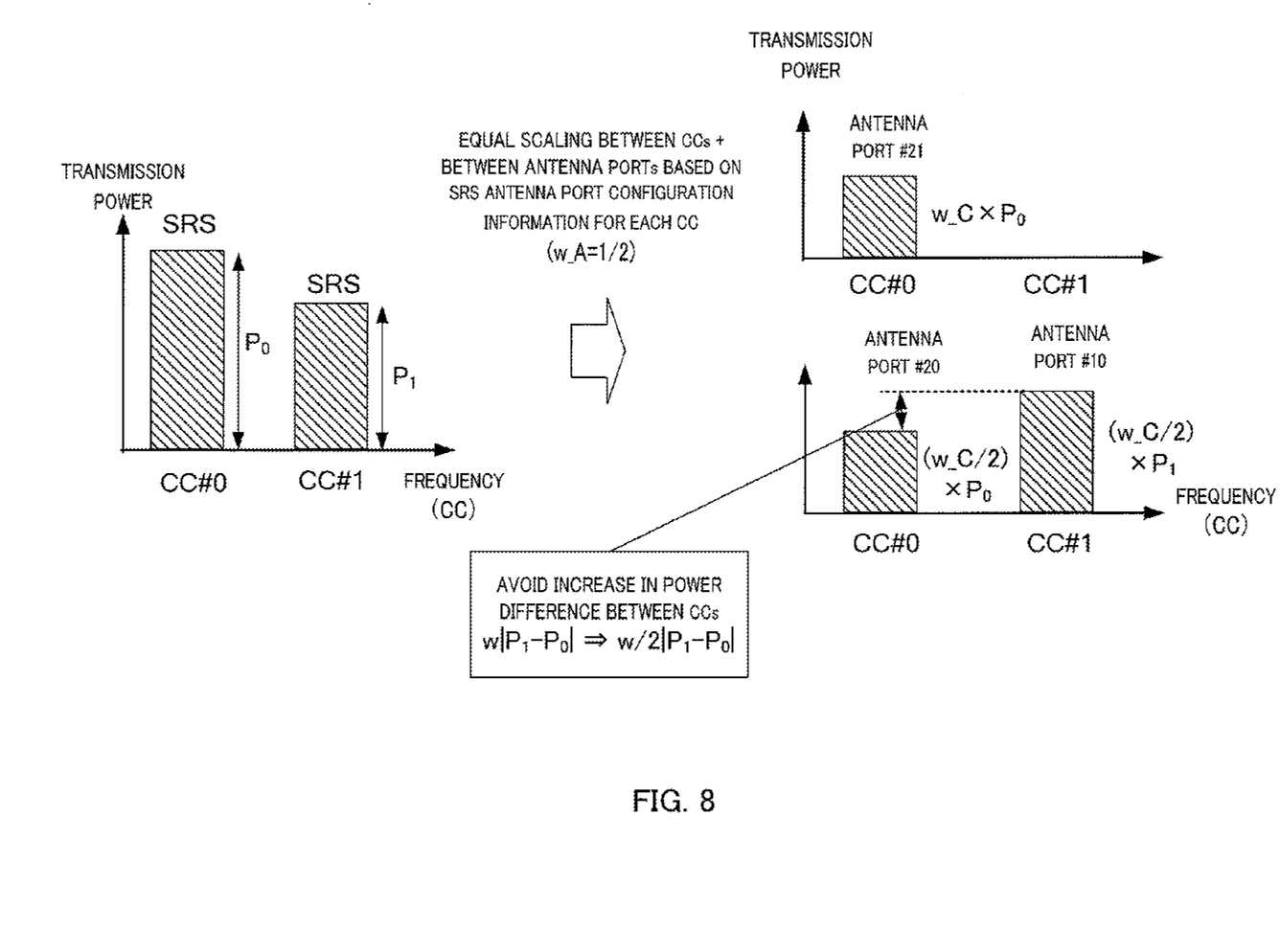
FIG. 8 is a diagram illustrating an overview of power scaling methods 3 and 4.

FIG. 8 illustrates an overview of power scaling method 3. FIG. 8 illustrates a case where CC#0 is configured with two antenna ports (antenna ports #20 and #21) for SRS transmission while CC#11 is configured with one antenna port (antenna port #10) for multiple SRS transmission by a control signal sent from the base station (higher layer signaling), when the number of CCs is two (CC#0 and CC#1). For example, only three SRSs in total are transmitted on the two CCs using the last symbol position of one subframe (see, FIG. 6). When the total value of transmission power of three SRS channels transmitted using the two CCs exceeds the UE-specific maximum transmission power in this situation, the equal total scaling weight (w_C×w_A) considering the weights (w_A) for multiple-antenna transmission is applied with respect to the antenna ports (or antenna port numbers or physical antennas) simultaneously transmitting SRSs, on the basis of the antenna port positions (numbers) configured for SRS transmission for each CC. In FIG. 8, the scaling weight w_A is set equal to ½ (this setting method will be described in detail with power scaling method 4).

Accordingly, the number of antenna ports involving deterioration of SRS measurement accuracy due to power scaling can be reduced. Power scaling is likely to cause the SRS transmission power that has been appropriately controlled by the base station so as to satisfy channel estimation accuracy using SRSs to be no longer satisfied. For that reason, the number of SRSs to which power scaling is applied is preferably kept as low as possible in order to satisfy the SRS measurement accuracy. As is apparent from a comparison between FIG. 7 and FIG. 8, while power scaling is applied to all SRSs when three SRSs are simultaneously transmitted in the case of FIG. 7, power scaling is only applied to two SRSs in FIG. 8, which illustrates power scaling method 3, because power scaling is applied only to the antenna port (physical antenna) simultaneously transmitting SRSs in this case.

Furthermore, when one PA is used to support a plurality of CCs, the PA supporting an antenna port (physical antenna) simultaneously transmitting SRSs is allowed to perform simple power control for the RF band by using one amplification factor, and the same effects as described above can be obtained.

(Power Scaling Method 4)

Power scaling method 4 is characterized by setting the scaling weights used among antenna ports to be w_A=1/(the number of SRSs configured for SRS transmission for the applicable antenna ports or applicable physical antenna ports) in such a way that the total scaling weight considering the scaling weights for multiple-antenna transmission is equal between the antenna ports (or antenna ports or physical antennas) simultaneously transmitting SRSs, and by applying the scaling weight to the applicable SRSs in power scaling method 3 described above.

FIG. 8 illustrates an overview of power scaling method 4. FIG. 8 illustrates a case where CC#0 is configured with two antenna ports (antenna ports #20 and #21) for SRS transmission while CC#1 is configured with one antenna port (antenna port #10) for multiple SRS transmission by a control signal sent from the base station (higher layer signaling), when the number of CCs is two (CC#0 and CC#1). For example, only three SRSs in total are transmitted on the two CCs using the last symbol position of one subframe (see, FIG. 6). When the total value of transmission power of three SRS channels transmitted using the two CCs exceeds the UE-specific maximum transmission power in this situation, the scaling weights w_A=1/(the number of SRSs configured for SRS transmission for the applicable antenna ports or applicable physical antenna ports) used among antenna ports is set equal to ½ in such a way that the total scaling weight (w_C×w_A) considering the scaling weights for multiple-antenna SRS transmission is equal between the component carriers and between the antenna ports on the basis of the antenna port positions or the number of antenna ports configured for SRS transmission between the CCs. This weight is used in scaling of transmission power of SRSs transmitted from antenna port #20 of CC#0 and antenna port #10 of CC#, which are the applicable antenna ports.

Thus, in addition to the effects obtained with power scaling method 3 described above, it is possible to obtain the effect of minimizing the mean sum of squares of a transmission power difference between CCs at the applicable antenna ports while avoiding an increase in transmission power difference between the CCs at the applicable antenna ports simultaneously transmitting SRSs. The processes of deriving the minimum mean sum of squares will be described below.

Avoiding an increase in transmission power difference between CCs at antenna ports simultaneously transmitting SRSs, by using scaling weights km (m=M−1) will be discussed herein. In addition, an attempt is made to "minimize the sum of mean squares of a transmission power difference between CCs at the applicable antenna ports" under the condition that "the sum of scaling weights km for simultaneous SRS transmission is kept constant (=1)." Specifically, as a formula, the following expression can be used to represent this case.

(Expression 3)

$$\min_{k_m} E\left[\sum_{m=0}^{M-1} |wk_m P_m - wk_{(m+x)modM} P_{(m+x)modM}|^2\right]$$

$$\text{subject to } \sum_{m=0}^{M-1} k_m = 1$$

[3]

In expression 3, M represents the number of CCs, Pm represents the total SRS transmission power on m-th CC, and x=0 to M−1.

Expression 4 can be derived using the Lagrange multiplier method (assuming that the average transmission power between the CCs is the same).

[4]

$$k_m = k_{m+x} = 1/M$$ (Expression 4)

As described above, using power scaling method 4 makes it possible to obtain the effect of avoiding an increase in transmission power difference between CCs even when the number of CCs is three or more, in addition to the effects obtained using power scaling method 3 described above.

It should be noted that, each of the power scaling methods described above can be applied to a case where UL channels other than SRSs (such as PUSCH, PUCCH, and DMRS) are simultaneously transmitted. Specifically, each of the power scaling methods can be applied to a physical control channel (PUCCH), which needs to be transmitted with low delay and used for transmitting important control information without any retransmission, or a reference signal (demodulation reference signal (DMRS)) used for estimating a propagation path as in the case of SRSs, or a pilot signal.

Accordingly, it is possible to avoid an increase in undesirable effects on bit rounding errors of a D/A converter as in the case described above, so that control information, reference signals, and pilot signals can be transmitted with high accuracy.

In addition, the equal scaling described above can be applied to a case where simultaneous transmission of periodic SRSs or (and) aperiodic SRSs occurs.

Each of the power scaling methods described above can be applied to a case where the number of antenna ports for each CC is the same. Accordingly, the same effects as those described above can be also obtained even when the number of antenna ports for each CC is the same (in addition to the case where the number of antenna ports for each CC varies).

Each of the power scaling methods described above can be applied only to a case where the number of SRS antenna ports configured for each CC varies. Specifically, the situation where the number of SRS antenna ports configured for each CC varies occurs can be used as a trigger for applying each of the power scaling methods.

In the power scaling methods described above, when the amount of transmission power reduced by equal scaling is equal to or greater than a predetermined value (i.e., the transmission power after the reduction is not greater than a predetermined value), the SRS with the transmission power may be dropped (the SRS is not transmitted or the transmission power is set equal to zero). Thus, when it is impossible to avoid the undesirable effects on bit rounding errors, the power consumption is not increased unnecessarily.

Moreover, although the power scaling methods have been described with application between CCs, the power scaling methods can be also applied to a plurality of SRSs in a CC.

Moreover, although the embodiment has been described on the basis of component carriers (CCs), each being regarded as the base unit of frequency (band), the embodiment is not limited to this, and the base unit of frequency may be something other than carrier components. For example, the base unit of frequency may be defined by a carrier, a subcarrier, or a subband including a plurality of subcarriers.

Moreover, each component carrier may be defined by a physical cell number and a carrier frequency number, and may be called a cell in some cases.

Moreover, the number of antenna ports may be defined by the number of physical antennas in the above-noted embodiment.

In addition, in the embodiment described above, power scaling weight w_C between component carriers may be a value reported by a base station using higher layer signaling or the like or may be a value individually set by the terminal.

Furthermore, the power scaling methods may be used in combination.

The present invention has been described above by examples of hardware implementations in the above-noted embodiment, but the present invention can be also implemented by software in conjunction with hardware.

In addition, the functional blocks used in the description of the embodiment are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor, which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The embodiment has been described with antennas, but the present invention can be applied to antenna ports in the same manner.

The term "antenna port" refers to a logical antenna including one or more physical antennas. In other words, the term "antenna port" does not necessarily refer to a single physical antenna, and may sometimes refer to an antenna array formed of a plurality of antennas, and/or the like.

For example, 3GPP LTE does not specify the number of physical antennas forming an antenna port, but specifies an antenna port as a minimum unit allowing each base station to transmit a different reference signal.

In addition, an antenna port may be specified as a minimum unit for multiplication of precoding vector weighting.

INDUSTRIAL APPLICABILITY

The disclosure of the specification, the drawing, and the abstract of Japanese Patent Application No. 2011-002285, filed on Jan. 7, 2011, is incorporated herein by reference in its entirety.

The present invention can be applied to mobile communication systems such as LTE-A.

REFERENCE SIGNS LIST 101-1 to 101-M Antenna
102 Radio reception processing section
103 OFDM demodulating section
104 Demodulating section
105 Channel decoding section
106 Control information extracting section
107 Transmission power calculating section
108 Power scaling detecting section
109 Power scaling controlling section
110-1 to 110-N Coding and modulation section
111-1 to 111-N Multiplexing section
112-1 to 112-N Transmission power setting section
113-1 to 113-N SC-FDMA modulation section
114 Combining section
115 Radio transmission processing section
116-1 to 116-M Transmission processing block section

The invention claimed is:

1. A radio communication terminal apparatus comprising:
a transmission power calculating section that calculates transmission power of a plurality of uplink channels on a plurality of component carriers of carrier aggregation, and a plurality of antenna ports;
a power scaling detecting section that detects whether or not power scaling occurs, by detecting, using the calculated transmission power, whether or not a total value of the transmission power of uplink channels transmitted using the plurality of component carriers and the plurality of antenna ports exceeds maximum transmission power specific to the apparatus; and
a power scaling controlling section that performs power scaling when the power scaling detecting section has detected that power scaling occurs, and also when a plurality of reference signals are to be transmitted using antenna ports configured for transmission of reference signals on component carriers, the power scaling being performed in such a way that a total scaling weight considering scaling weights for multiple-antenna transmission becomes equal between the component carriers, or between the component carriers and between the antenna ports, on a basis of the number of antenna ports, or antenna port positions, or antenna port numbers configured for transmission of reference signals on the component carriers; wherein,
in the power scaling controlling section, a first scaling weight is equal to 1/A, where A is the number of reference signals to be transmitted using component carriers and antenna ports, the first scaling weight being used among the antenna ports, and the component carriers and the antenna ports being configured for transmission of reference signals.

2. The radio communication terminal apparatus according to claim 1, wherein the power scaling controlling section applies a total scaling weight to power scaling of all reference signals, the total scaling weight being calculated by multiplying a second scaling weight by the first scaling weight, the second scaling weight being used among the component carriers.

3. A radio communication terminal apparatus comprising:
a transmission power calculating section that calculates transmission power of a plurality of uplink channels on a plurality of component carriers of carrier aggregation, and a plurality of antenna ports;
a power scaling detecting section that detects whether or not power scaling occurs, by detecting, using the calculated transmission power, whether or not a total value of the transmission power of uplink channels transmitted using the plurality of component carriers and the plurality of antenna ports exceeds maximum transmission power specific to the apparatus; and
a power scaling controlling section that performs power scaling when the power scaling detecting section has detected that power scaling occurs, and also when a plurality of reference signals are to be transmitted using antenna ports configured for transmission of reference signals on component carriers, the power scaling being performed in such a way that a total scaling weight considering scaling weights for multiple-antenna transmission becomes equal between the component carriers, or between the component carriers and between the antenna ports, on a basis of the number of antenna ports, or antenna port positions, or antenna port numbers configured for transmission of reference signals on the component carriers, wherein the power scaling controlling section performs power scaling by applying an equal total scaling weight considering scaling weights for multiple-antenna transmission only with respect to antenna ports or antenna port numbers, or physical antennas simultaneously transmitting reference signals SRS, wherein, in the power scaling controlling section, a first scaling weight is equal to 1/A, where A is the number of reference signals to be transmitted using the antenna ports or the physical antennas simultaneously transmitting the reference signals SRS, the first scaling weight being used among the antenna ports.

4. A power control method comprising:

calculating transmission power of a plurality of uplink channels on a plurality of component carriers of carrier aggregation, and a plurality of antenna ports;

detecting whether or not power scaling occurs, by detecting, using the calculated transmission power, whether or not a total value of the transmission power of uplink channels transmitted using the plurality of component carriers and the plurality of antenna ports exceeds maximum transmission power specific to an apparatus transmitting the UL channels; and performing power scaling when it has been detected that power scaling occurs, and also when a plurality of reference signals are to be transmitted using antenna ports configured for transmission of reference signals on component carriers, the power scaling being performed in such a way that a total scaling weight considering scaling weights for multiple-antenna transmission becomes equal between the component carriers, or between the component carriers and between the antenna ports, on a basis of the number of antenna ports, or antenna port positions, or antenna port numbers configured for transmission of reference signals on the component carriers, wherein, in the performing the power scaling, a first scaling weight is equal to 1/A, where A is the number of reference signals to be transmitted using component carriers and antenna ports, the first scaling weight being used among the antenna ports, and the component carriers and the antenna ports being configured for transmission of reference signals.

5. A power control method comprising:

calculating transmission power of a plurality of uplink channels on a plurality of component carriers of carrier aggregation, and a plurality of antenna ports;

detecting whether or not power scaling occurs, by detecting, using the calculated transmission power, whether or not a total value of the transmission power of uplink channels transmitted using the plurality of component carriers and the plurality of antenna ports exceeds maximum transmission power specific to an apparatus transmitting the UL channels; and performing power scaling when it has been detected that power scaling occurs, and also when a plurality of reference signals are to be transmitted using antenna ports configured for transmission of reference signals on component carriers, the power scaling being performed in such a way that a total scaling weight considering scaling weights for multiple-antenna transmission becomes equal between the component carriers, or between the component carriers and between the antenna ports, on a basis of the number of antenna ports, or antenna port positions, or antenna port numbers configured for transmission of reference signals on the component carriers; wherein the power scaling is performed by applying an equal total scaling weight considering scaling weights for multiple-antenna transmission only with respect to antenna ports or antenna port numbers, or physical antennas simultaneously transmitting reference signals SRS, wherein, in the performing the power scaling, a first scaling weight is equal to 1/A, where A is the number of reference signals to be transmitted using the antenna ports or the physical antennas simultaneously transmitting the reference signals SRS, the first scaling weight being used among the antenna ports.

* * * * *